(12) United States Patent
Berg et al.

(10) Patent No.: US 10,918,242 B2
(45) Date of Patent: Feb. 16, 2021

(54) SYSTEM FOR ROASTING AGRICULTURAL PRODUCTS

(71) Applicants: Marshall Berg, Portland, OR (US); Nathaniel Gallagher, Portland, OR (US)

(72) Inventors: Marshall Berg, Portland, OR (US); Nathaniel Gallagher, Portland, OR (US)

( * ) Notice: Subject to any disclaimer, the term of this patent is extended or adjusted under 35 U.S.C. 154(b) by 295 days.

(21) Appl. No.: 15/951,841

(22) Filed: Apr. 12, 2018

(65) Prior Publication Data

US 2018/0296029 A1 Oct. 18, 2018

Related U.S. Application Data

(60) Provisional application No. 62/484,675, filed on Apr. 12, 2017.

(51) Int. Cl.
*A47J 37/04* (2006.01)
*A47J 37/07* (2006.01)

(52) U.S. Cl.
CPC ......... *A47J 37/047* (2013.01); *A47J 37/0704* (2013.01); *A47J 37/0745* (2013.01)

(58) Field of Classification Search
CPC ... A47J 37/047; A47J 37/0704; A47J 37/0745
See application file for complete search history.

(56) References Cited

U.S. PATENT DOCUMENTS

| | | | | | |
|---|---|---|---|---|---|
| 3,399,024 | A | * | 8/1968 | Branson | F23D 14/10 431/286 |
| 4,048,473 | A | * | 9/1977 | Burkhart | A47J 27/004 219/389 |
| 5,182,981 | A | * | 2/1993 | Wilcox | A23N 12/10 219/389 |
| 2008/0081308 | A1 | * | 4/2008 | Witzel | F23D 14/62 431/354 |

* cited by examiner

*Primary Examiner* — Ryan J. Walters
(74) *Attorney, Agent, or Firm* — Ortiz & Lopez, PLLC; Luis M. Ortiz; Kermit D. Lopez

(57) ABSTRACT

A roasting system for roasting agricultural products (e.g., chili) includes a barrel-basket having a beveled, open-ended rim that allows for easy loading and unloading of agricultural product. The beveled, open-ended rim helps keep the agricultural product from falling out during rotation and when in use for roasting. A support yoke integrated with a U-frame and can be rotatably coupled to a closed end of the barrel-basket, opposite the beveled, open-ended rim. The support yoke enables the barrel-basket to be adjusted by the operator via a control arm. A burner array can be disposed in association with the U-frame and configured to enable flame emitting therefrom to be directed towards and into the barrel-basket. The control arm can be coupled to the U-frame to provide pivoting motion of the barrel-basket into a variety of set positions during operation for loading the agricultural product into the barrel-basket through the beveled, open-ended rim, roasting the agricultural product at various angles in reference to the burner array, and for unloading the agricultural product from the barrel-basket (Continued)

through the beveled, open-ended rim without the need to stop rotation of the barrel-basket or requiring handling of the barrel-basket directly in any way.

20 Claims, 4 Drawing Sheets

SYSTEM FOR ROASTING AGRICULTURAL PRODUCTS

CROSS REFERENCE TO RELATED APPLICATION

This patent application claims the priority and benefit under 35 U.S.C. § 119(e) of U.S. Provisional Patent Application Ser. No. 62/484,675, filed Apr. 12, 2017, entitled "SYSTEM FOR ROASTING AGRICULTURAL PRODUCTS." U.S. Provisional Patent Application Ser. No. 62/484,675 is herein incorporated by reference in its entirety.

TECHNICAL FIELD

The present invention is related to the roasting of agricultural products and agricultural roasting systems. The present invention is also related to portable agricultural processing systems. More particularly, the present invention is related to portable systems for roasting agricultural products including chili peppers, coffee, fruits, herbs, nuts, vegetables, and other agricultural products wherein the system is self-contained, portable, and can be mounted or dismounted to a motor vehicle for transport.

BACKGROUND

Portable vegetable roasters that incorporate a rotating barrel basket, venturi burner, and fuel delivery systems are known. FIG. 1, labeled as "prior art," provides a photograph 100 with a fair representation of such a system. These conventional designs, however, are relatively outdated with respect to food safety standards, ease and efficiency of use, and fuel economy. For example, portable chili roasters such as that shown in FIG. 1 are in wide use within the United States. Most every portable chili roaster is provided in the form of a large barrel basket formed with wire mesh walls and includes a closable door on its side. The barrel basket is rotatably mounted on both of its ends to a frame, and is limited in overall mobility other than its motorized rotation. U.S. Patent Publication 2011/0097468A1 to Discoll et al. is fairly representative of such a barrel design. A gas supply and venturi burner as the flame source is typically directed at the interior area of the barrel basket through its contiguous side (e.g., area between the two ends). A motor, belt, and pulley system causes rotation of the barrel at bearings located on its two ends and also integrated with frame posts at each side of a frame to rotatably support the barrel at its two ends. A lever is typically attached near one end of the barrel for temporarily attaching to the end to enable tilting of the barrel about the bearings and to enable the removal of the chili through the opening revealed by the closable door when it is opened, which would be after the chili has been fully roasted therein. This activity is what is being shown with the worker handling the lever as depicted in FIG. 1.

Known barrel-basket components do not fold, readily dismantle, or otherwise pivot in a manner which effectively minimizes physical contact and continuous exposure of the operator to dangerous hot materials, nor do the known systems provide a means to safely remove the food products once roasted to limit contact with unclean surfaces or operators hands and gloves in accordance to HACCP guidelines and GMPs for the Food Industry as defined by the FDA.

As illustrated in FIG. 1, the known roaster 100 has a fully enclosed barrel requiring the operator to stop the motion of and physically unlatch and open the door of the barrel-basket. The roasted vegetables are then manually unloaded from the barrel-basket by the operator often having to scoop the roasted product out of the barrel opening onto a funneling tray system, where after the chili falls into or is swept into a basket or bag. This creates additional hazards as food comes in contact with operators hands or Kevlar gloves (when used and meant for handling hot metal, not food) as well as food contact surfaces (the funneling system), which are not necessarily cleaned in between operation and are not in contact with the sterilizing heat of the burner system. This can create a potential environment for hazardous microbial growth to spread into the finished food product.

Known systems incorporate crude designs for their burners and fuel delivery system, which do not consider fuel consumption or pollution from excess fuel in the system and which cannot property burn off, and deposits ash into the environment and food products.

Accordingly, the conventional design of "portable vegetable roasters" is unduly expensive and wasteful insofar as costs of fuel (due to current burner design) and required operations are concerned. What are needed are improvements for portable agricultural roasting systems, such as the chili roaster.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

While portable pepper roasters have the drawbacks summarized above and others, they nonetheless are the current most widely used system for quickly and easily flame roasting large batches of peppers or other food products for consumers, processors, and others during short local harvests. Accordingly, the possibility of constructing a safer, more efficient, and competitively priced portable roaster was compelling to the present inventors. This is especially so since the vastness of improvements over known models are not limited to one aspect of improvement, but rather to every operational component, which has been redesigned with functional harmony in mind.

In accordance with an example embodiment, what is provided by the present inventors is a system that provides a simple, inexpensive, and reliable portable vegetable roasting system. The portable roasting system can be easily operated, even by novices, according to simple operating instructions in a safe and efficient manner.

The portable vegetable roasting system in accordance with the inventive embodiments includes a barrel-basket having a beveled, open-ended rim that allows for easy loading and unloading of peppers or other food products. The bevel helps keep the product from falling out during rotation and when in use for roasting. The barrel-basket can be similar in shape to a cement mixer barrel, but instead of a solid wall forming the contiguous side of its body, a unitary side of the barrel-basket is made of a metal mesh to enable flames to pass through what is the contiguous side of its body.

In accordance with another feature, the barrel-basket is mounted to a support yoke that can be adjusted by the operator via a control arm, which provides pivoting motion and a variety of set positions during operation for loading, roasting at various angles in reference to the burners, and unloading product without the need to stop the rotation or handle the barrel directly in any way.

The barrel-basket can be driven by a motor directly or using a combination of belts, chains, and/or pulleys. Alternatively, the barrel-basket can be driven directly via a gear reduction box. The motor speed can also be adjustable electrically.

In accordance with yet another feature, a toothed crown can be stamped into the rim of one drum part for driving the barrel-basket when assembled.

In accordance with another feature, a motor can be provided which has a protective housing.

In accordance with another feature, the portable vegetable roasting system can include a foldable frame that can include a central section in the shape of a square "U," a central section including upstanding arms, which can be somewhat longer than the height of the larger part of the drum. The central section can also have a base of a width which can be somewhat greater than the largest diameter of the drum.

In accordance with another features, two triangular legs and axle sections can be provided. This section can be detachably fastened to a lower corner of the central section. One leg of the triangular section can be provided in the form of an axle on which two wheels can be mounted. An opposite leg can have holes or plates for mounting locking rational casters.

In accordance with yet another feature, a venturi burner or burners can be provided that are hand or machine fashioned from rectangular material which has circular cut outs in the small sides of the top and cross shaped brackets welded to the bottom with holes tapped in the center to easily screw on to the fuel delivery system. Multiple burners can be connected via a cross bracket which keeps them in place.

In accordance with another feature, barrel-basket parts can include an enclosed bottom rim which drives the rotation, a basket made from a single sheet of expanded or perforated stainless steel, or stainless steel wire mesh, a top rim which is open ended and beveled, and assembly hardware (nuts, bolts, washers, lockwashers, and eye-bolts) that can be made from stainless steel. Rims of the barrel-basket can provide mounting positions and support for the wrapping the sheet of perforated material, which can form the barrel-basket assembly once fastened with the hardware mentioned. All of the barrel-basket components can be made from food grade stainless steel or coated with food grade electroless nickel plating. These materials can also provide corrosion resistance for the food contact surfaces.

In accordance with another features, the barrel rims and motor housing parts can be stamped or drawn (spun) from thin sheet metal. The frame parts can be formed from commercially available tubular stock or channels. The central section of the frame, for example, can be formed from channels of U-shaped cross-section. Thus, the entire assembly can be fabricated from inexpensive, readily available, and light-weight materials, but the finished product is one which is strong and robust.

In accordance with another feature, food contact surfaces can be made from, or coated with, food safe materials, while non-contact surfaces are powder coated.

In accordance with another feature, a waterproof switch is mounted into the frame opposite the side of the motor under the control handle on the "operator side."

In accordance with another feature, a fuel delivery system can be provided that includes a fuel pressure regulator and custom designed bracket, single or dual propane tank connections, spans of fuel hose, brass or other suitable material hard connections and pipe, as well as orifices delivering specific fuel flow patterns into the burners that aid in better fuel consumption and clean burning flames.

In accordance with another features, a custom burner bracket can be employed to which the fuel delivery system and burners can be mounted at an angle specific to the size and application of the unique portable vegetable roasting system following design principals laid out herein.

In accordance with yet another features of the embodiments, a novel shaft and bearing assembly can be provided for supporting the barrel-basket. The assembly can include a pair of dish-shaped members formed therein. These dish-shaped members can be formed of sheet metal by stamping or drawing and each includes a bearing supporting recess. Shaft bearings can be disposed in these recesses and the barrel-basket support shaft can be journaled in the bearings. Snap rings can be provided to maintain the bearings in spaced relationship and within the supporting dishes. The dishes are secured together at perimetral flanges, when flanges in turn are removably fastened to the base of the mixer by removable fasteners. Thus, the removable and inexpensive bearing and shaft assembly can be provided that both exhibits good strength properties and shields the bearings from contamination by dirt or other foreign matter.

In accordance with additional features, highly reliable and dependable drive can be provided with the present system. As indicated in above, a toothed crown can be provided wherein the bottom barrel-basket rim part is equipped with a notched perimetral flange. The flange forms an annular rack for receiving the teeth of a drive pinion. The flange, when stamped to form the rack, can them be formed in such away that the teeth of a drive pinion will not be abraded or cut by metal defining the rack openings. A plastic pinion can then be used to good advantage to provide quietness of operating characteristics. One manner in which the possibility of abrasion and cutting of the pinion teeth can be obviated is by providing upturned rack portions on the side of each pinion-tooth-receiving aperture that is engaged by a pinion tooth, which extend further than the upturned portions on the opposite side of each such aperture. Thus, the metal deformed outwardly to form each aperture can be in two portions on either side of the aperture. The tooth engaging one of the portions can be larger than the opposite portion so as to obviate any possibility of the top of the tooth engaging portion abrading a tooth.

As has been indicated, the motor housing in accordance with features of the embodiment can include two flanged drawings or stampings. When the flanges are connected together, a very rigid motor housing can be provided although made of sheet steel.

In accordance with an alternate embodiment, slots can be formed in the walls of the housing for receiving motor mounting bolts so that the motor may be adjusted, for example, to tension a drive V belt, while the housing is maintained in assembled and closed condition.

In accordance with yet another alternate embodiment, the motor can be attached to a 90-degree gear reduction box. Both can be mounted via the slots in the walls of the housing and adjusted to match the position of the drive shaft and the gear reduction box output.

Other objects and a fuller understanding of the invention may be had by referring to the following description and claims taken in conjunction with the accompanying drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation."

Figure 1:
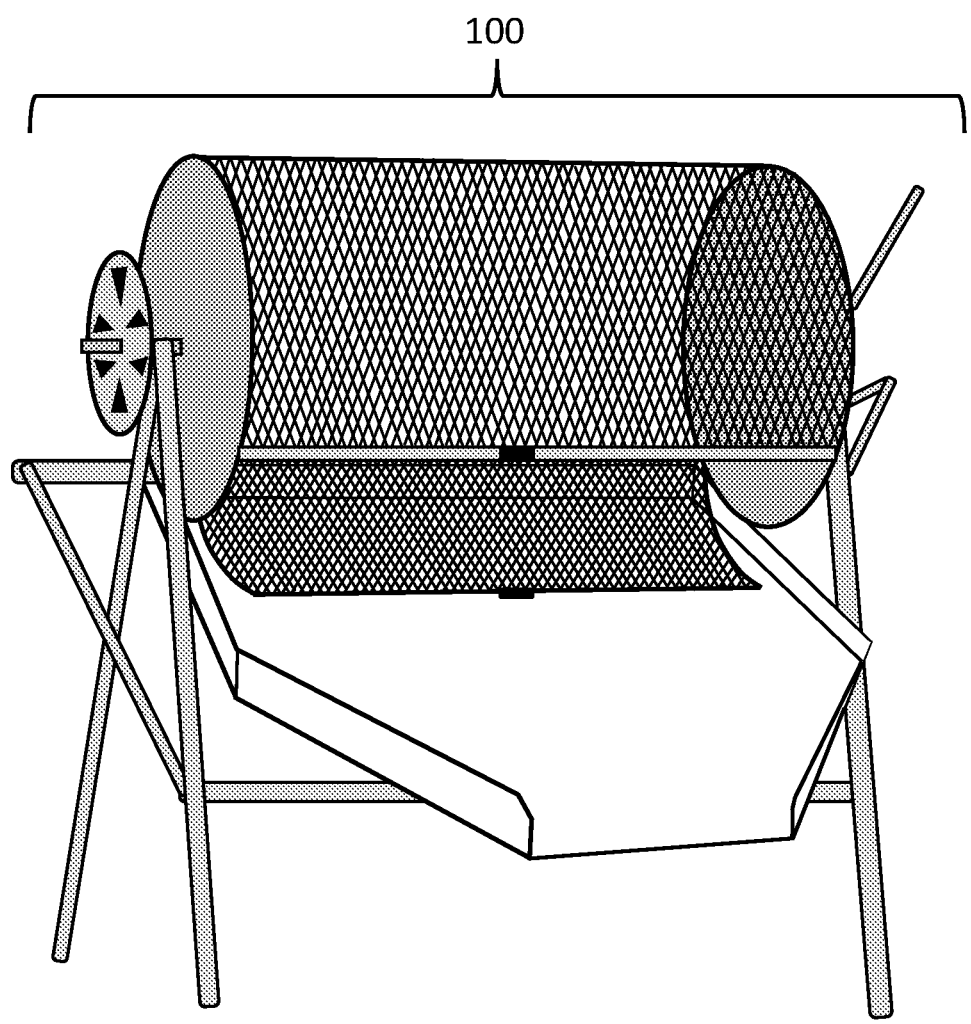
FIG. 1, labeled "prior art," illustrates a photograph showing a front view of a known chili roasting system with an operator tilting the barrel to remove roasted chili contained therein onto a funneled tray.
Figure 2A:
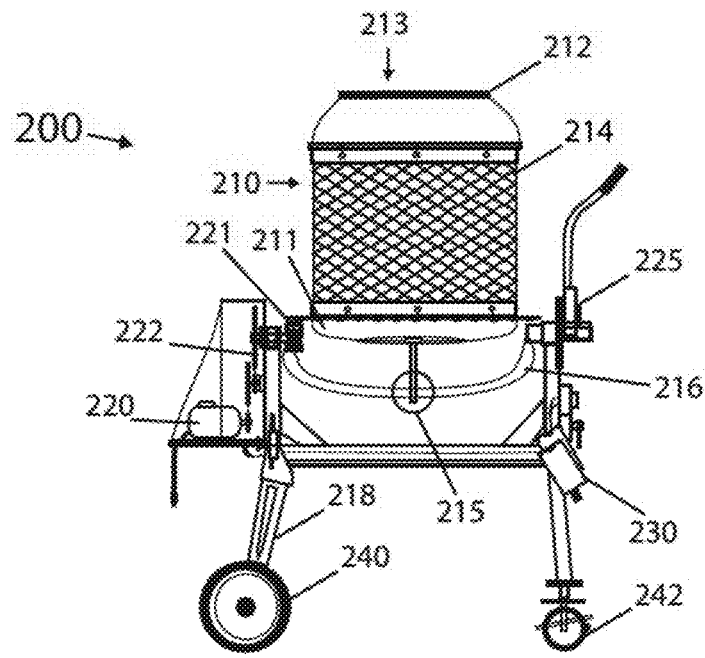
FIGS. 2A-2C illustrate front, right side, and left side views, respectively, of a system in accordance with an example embodiment.
Figure 2B:
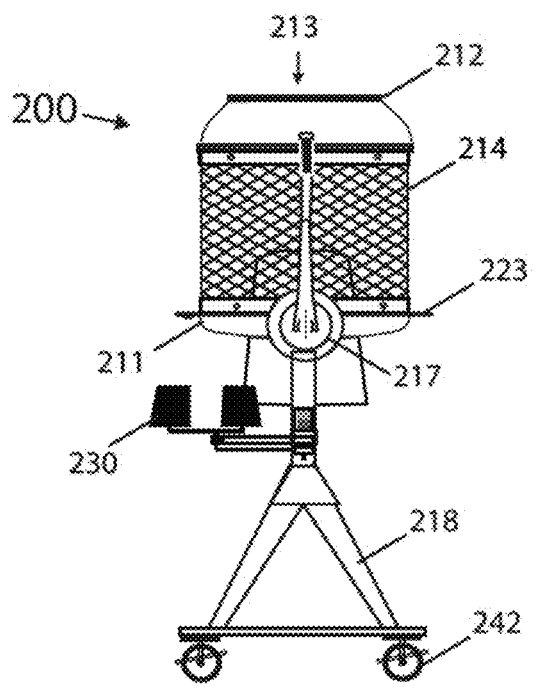
Figure 2C:
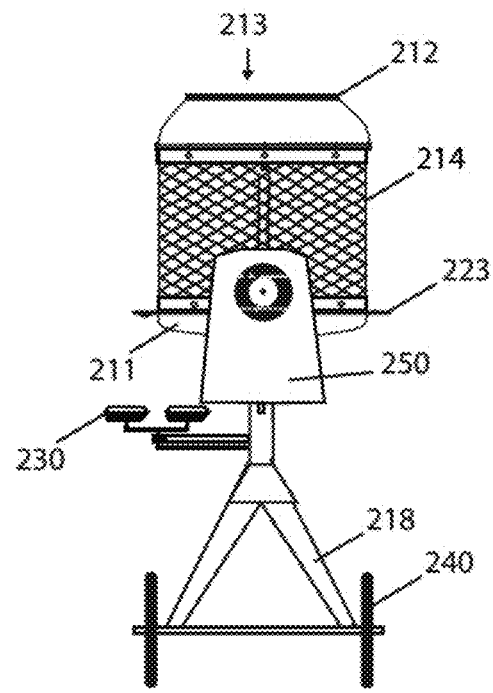

Referring to FIGS. 2A-2C, illustrated are front (2A), right side (2B), and left side (2C) views, respectively, of a system 200 in accordance with the embodiments. A barrel-basket 210 includes a closed end 211, a beveled, open-ended rim 212 defining an open end 213, and a unitary side 214 disposed between the closed end 211 and the open end 213. The beveled, open-ended rim 212 enables loading and unloading of agricultural product through the open end 213 and can prevent agricultural product from falling out of the barrel-basket 210 during its rotation and when the open end 213 is oriented in height above the closed end 211 during roasting of the agricultural product. A support yoke 215 can be integrated with a U-frame 216 and rotatably coupled to a center of the closed end 211 of the barrel-basket 210, opposite the beveled, open-ended rim 212 to facilitate rotation of the barrel-basket 210 by mechanical action 221 from a motor 220 and the U-frame 216 enables pivotal orientation of the barrel-basket to be adjusted about a rotatably support shaft 217 where the U-frame is rotatably attached to an A-frame assembly.

A burner array 230 can be disposed in association with the A-frame and configured to enable flame emitting therefrom to be directed towards and into the barrel-basket 210 when it is oriented in roasting position. A control arm 225 is coupled to the U-frame to enable orientation of the barrel-basket 210 by an operator via the control arm 225.

Figure 3A:
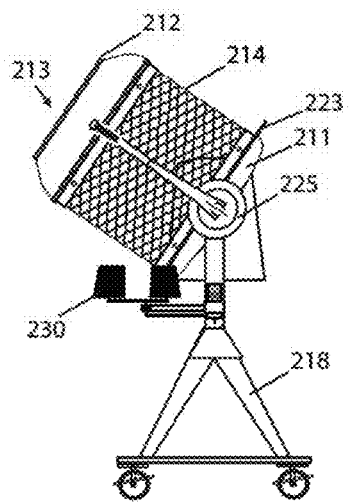
FIGS. 3A-3C illustrate right side views of the system in various operational positions when in use and when being manipulated by a control arm.
Figure 3B:
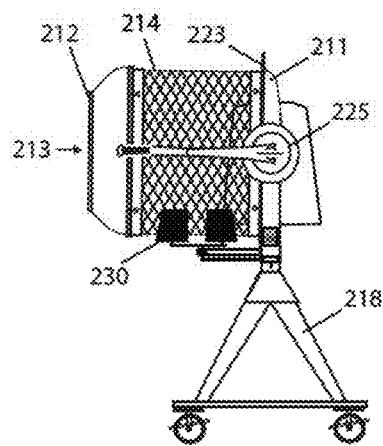
Figure 3C:
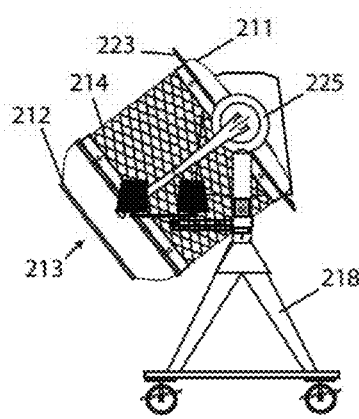

Referring to FIGS. 3A-3C, the control arm 225 can be configured to provide pivoting motion of the barrel-basket 210 at the U-frame 216 about the A-frame 218 where they are rotatably joined by the rotatable support shaft 217, and also adjust the height of open end 213 with respect to the closed end 211 as a result of the pivoting. The height of the open end 213 with respect to the closed end 211 can be manipulated into a variety of positions by an operator using the control arm 225 during operation including: a position as shown in FIG. 3A for loading agricultural product into the barrel-basket 210 through the beveled, open-ended rim 212, a position for roasting the agricultural product as shown in FIG. 3B, which can also be at various angles in reference to the burner array 230, and then as shown in FIG. 3C, a position for unloading the agricultural product from the barrel-basket 210 through the open end 213 form by the beveled, open-ended rim 212 (even without the need to stop rotation of the barrel-basket or requiring handling of the barrel-basket directly in any way).

Figure 4A:
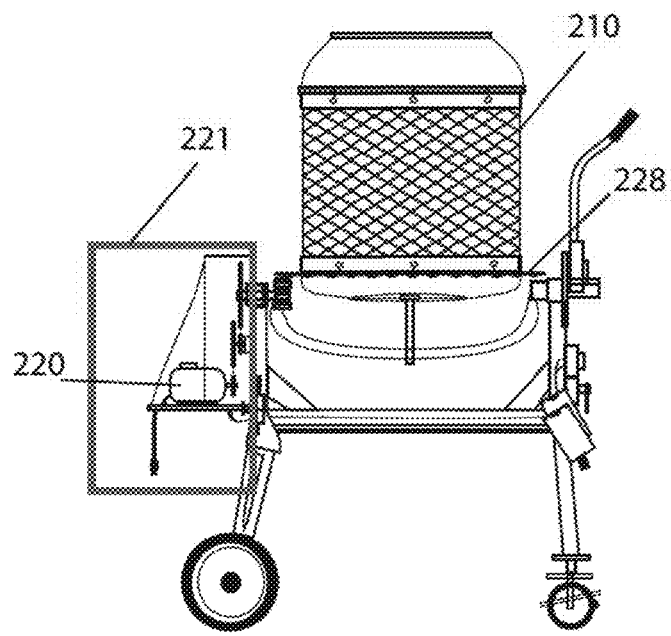
FIGS. 4A-4D illustrate views for alternate motor drive arrangements, in accordance with features of the embodiments.
Figure 4B:
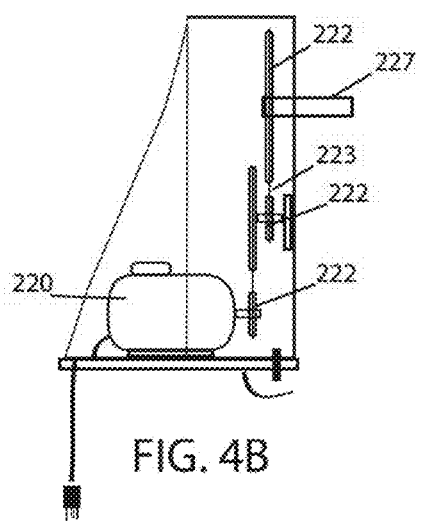
Figure 4C:
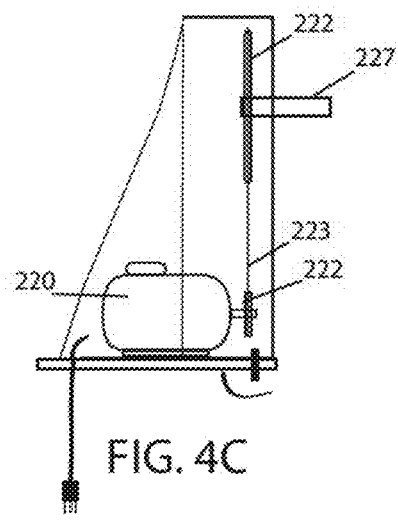
Figure 4D:
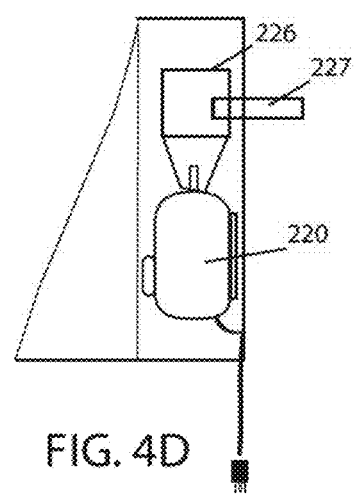

FIGS. 4A-4D illustrate views for alternate motor drive arrangements, in accordance with features of the embodiments. Mechanical action 221 can be provided from an electric motor 220 to a shaft 227 that can be movably coupled to a toothed crown 228 (e.g., a disk with teeth) integrated with and wrapping around the side of the barrel-basket 210 to cause rotation of the barrel-basket 210. As illustrated in FIG. 4B, the motor 220 can provide mechanical power to the shaft 227 via a series of pulleys 222 and belts 223 (or chains) which operate together to step down rotation speed from the motor. Referring to FIG. 4C, the motor 220 can also provide mechanical power to the shaft 227 via a single belt 223 wrapped around two pulleys 222 associated with the motor 220 and shaft 227, which is normal pulley-best configuration and does to step down rotation speed. Mechanical power from the motor 220 can also be provided via direct linkage to the shaft 227 via a gear box 226 containing an arrangement of gearing to effect (by reduction) the coupling of power from the motor 220 to the shaft 227, as shown in FIG. 4D. Power from the motor can also be adjusted electrically by introducing electrical resistance as with an electrical potentiometer (not shown).

A system provides a simple, inexpensive, and reliable portable vegetable roasting system. The portable roasting system can easily be operated, even by novices, according to simple operating instructions in a safe and efficient manner. The bevel shape is unique for a roaster because it helps keep the product from falling out during rotation and when in use for roasting.

In accordance with another features, a motor can be provided which has a protective housing as shown in FIG. 4D.

The portable vegetable roasting system can include a foldable frame that can include a central section in the shape of a square "U," and the A-frame assembly 218 that can include a central section including upstanding arms, which can be somewhat longer than the height of the larger part of the barrel-basket 210. The central section can also have a base of a width, which is somewhat greater than the largest diameter of the drum (barrel-basket).

Two triangular legs and axle sections can be provided as part of the A-frame 218. This section can be detachably fastened to a lower corner of the central section. One leg of the triangular section can be provided in the form of an axle on which two wheels 240 can be mounted, as shown in FIG. 2A. An opposite leg can have holes or plates for mounting locking rational casters 242, also shown in FIG. 2A.

A venturi burner 230 or burners can be provided that are hand or machine fashioned from rectangular material which has circular cut outs in the small sides of the top and cross shaped brackets welded to the bottom with holes tapped in the center to easily screw on to the fuel delivery system. Multiple burners can be connected via a cross bracket which keeps them in place, as shown in FIGS. 2B and 2C.

Barrel-basket parts can include an enclosed bottom rim which drives the rotation, a basket made from a single sheet of expanded or perforated stainless steel, or stainless steel wire mesh, a top rim which is open ended and beveled, and assembly hardware (nuts, bolts, washers, lockwashers, and eye-bolts) that can be made from stainless steel. Rims of the barrel-basket can provide mounting positions and support for the wrapping the sheet of perforated material, which forms the barrel-basket assembly once fastened with the hardware mentioned. All of the barrel-basket components can be made from food grade stainless steel or coated with food grade electroless nickel plating. These materials also provide corrosion resistance for the food contact surfaces.

Barrel rims and motor housing parts can be stamped or drawn (spun) from thin sheet metal. The frame parts can be formed from commercially available tubular stock or channels. The central section of the frame, for example, can be formed from channels of U-shaped cross-section. Thus, the entire assembly can be fabricated from inexpensive, readily available, and light-weight materials, but the finished product is one which is strong and robust.

Food contact surfaces can be made from, or coated with, food safe materials, while non-contact surfaces are powder coated. A waterproof switch can be mounted into the frame opposite the side of the motor under the control handle on the "operator side." A fuel delivery system can be provided that includes a fuel pressure regulator and custom designed bracket, single or dual propane tank connections, spans of fuel hose, brass or other suitable material hard connections and pipe, as well as orifices delivering specific fuel flow patterns into the burners that aid in better fuel consumption and clean burning flames.

A custom burner bracket can be employed to which the fuel delivery system and burners can be mounted at an angle specific to the size and application of the unique portable vegetable roasting system following design principals laid out herein.

A novel shaft and bearing assembly can be provided for supporting the barrel-basket. The assembly can include a pair of dish-shaped members formed therein. These dish-shaped members can be formed of sheet metal by stamping or drawing and each includes a bearing supporting recess. Shaft bearings can be disposed in these recesses and the barrel-basket support shaft can be journaled in the bearings. Snap rings can be provided to maintain the bearings in spaced relationship and within the supporting dishes. The dishes are secured together at perimetral flanges, when flanges in turn are removably fastened to the base of the mixer by removable fasteners. Thus, the removable and inexpensive bearing and shaft assembly can be provided that both exhibits good strength properties and shields the bearings from contamination by dirt or other foreign matter.

Highly reliable and dependable drive can be provided with the present system. As indicated in above, a toothed crown can be provided wherein the bottom barrel-basket rim part is equipped with a notched perimetral flange. The flange forms an annular rack for receiving the teeth of a drive pinion. The flange, when stamped to form the rack, can then be formed in such away that the teeth of a drive pinion will not be abraded or cut by metal defining the rack openings. A plastic pinion can then be used to good advantage to provide quietness of operating characteristics. One manner in which the possibility of abrasion and cutting of the pinion teeth can be obviated is by providing upturned rack portions on the side of each pinion-tooth-receiving aperture that is engaged by a pinion tooth, which extend further than the upturned portions on the opposite side of each such aperture. Thus, the-metal deformed outwardly to form each aperture can be in two portions on either side of the aperture. The tooth engaging one of the portions can be larger than the opposite portion so as to obviate any possibility of the top of the tooth engaging portion abrading a tooth.

The motor housing in accordance with features of the embodiment can include two flanged drawings or stampings. When the flanges are connected together, a very rigid motor housing can be provided although made of sheet steel. Slots can be formed in the walls of the housing for receiving motor mounting bolts so that the motor may be adjusted, for example, to tension a drive V belt, while the housing is maintained in assembled and closed condition. The motor can be attached to a 90-degree gear reduction box. Both can be mounted via the slots in the walls of the housing and adjusted to match the position of the drive shaft and the gear reduction box output.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations can be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A roasting system, comprising:
a barrel-basket having a closed end, a beveled, open-ended rim defining an open end, and a unitary side disposed between the closed end and the open end, said unitary side made of a metal mesh to enable flames to pass therethrough onto agricultural product contained therein, wherein the beveled, open-ended rim enables loading and unloading of the agricultural product through the open end, and wherein the beveled, open-ended rim prevents the agricultural product from falling out of the barrel-basket during rotation and when the open end is oriented in height above the closed end during roasting of the agricultural product;
a support yoke integrated with a U-frame and rotatably coupled to a center of the closed end of the barrel-basket, opposite the beveled, open-ended rim, wherein the support yoke facilitates rotation of the barrel-basket by mechanical action from a motor; and
a burner array disposed in association with the U-frame and configured to enable flame emitting therefrom to be directed towards and through the metal mesh of the unitary side of the barrel-basket onto agricultural product contained inside of the barrel-basket.

2. The roasting system of claim 1, further comprising a control arm coupled to the U-frame to enable orientation of the barrel-basket by an operator via the control arm, wherein the control arm is configured to provide pivoting motion of the barrel-basket and the height of open end with respect to the closed end into a variety of positions during operation including a position for loading the agricultural product into the barrel-basket through the beveled, open-ended rim, a position for roasting the agricultural product at various angles in reference to the burner array, and a position for unloading the agricultural product from the barrel-basket through the beveled, open-ended rim without the need to stop rotation of the barrel-basket or requiring handling of the barrel-basket directly in any way, wherein the U-frame enables pivotal orientation of the barrel-basket to be adjusted.

3. The system of claim 1, wherein the barrel-basket can be driven at the yoke by a motor coupled to the closed end using a combination of at least one pulley with at least one of belts or chains.

4. The system of claim 3, wherein speed of the motor is electrically adjustable.

5. The system of claim 1, wherein the barrel-basket can be driven directly at the closed end via a gear reduction box.

6. The system of claim 5, wherein speed of the motor is electrically adjustable.

7. The system of claim 1, wherein the U-frame further comprises a foldable frame including a central section in the shape of a square "U," upstanding arms, and a base with a width greater than the largest diameter of the drum.

8. The system of claim 7, further comprising two triangular legs and axle sections connected to each of the triangular legs, and wheels mounted to at least one of the axle sections to enable movement of the system over surfaces.

9. The system of claim 1, wherein the burner array further comprises a venturi burner including circular holes cut into a rectangular burner housing.

10. The system of claim 1, wherein the burner array is mounted to a cross bracket that is further mounted to the U-frame.

11. A roasting system, comprising:
a barrel-basket having a closed end, a beveled, open-ended rim defining an open end, and a unitary side disposed between the closed end and the open end, said unitary side made of a metal mesh to enable flames to pass therethrough onto agricultural product contained therein, wherein the beveled, open-ended rim enables loading and unloading of the agricultural product through the open end, and wherein the beveled, open-ended rim prevents the agricultural product from falling out of the barrel-basket during rotation and when the open end is oriented in height above the closed end during roasting of the agricultural product;
a support yoke integrated with a U-frame and rotatably coupled to a center of the closed end of the barrel-basket, opposite the beveled, open-ended rim, wherein the support yoke facilitates rotation of the barrel-basket by mechanical action from a motor and the U-frame enables pivotal orientation of the barrel-basket to be adjusted;
a burner array disposed in association with the U-frame and configured to enable flame emitting therefrom to be directed towards and through the metal mesh of the unitary side of the barrel-basket onto agricultural product contained inside of the barrel-basket; and
a control arm coupled to the U-frame to enable orientation of the barrel-basket by an operator via the control arm, wherein the control arm is configured to provide pivoting motion of the barrel-basket and the height of open end with respect to the closed end into a variety of positions during operation including a position for loading the agricultural product into the barrel-basket through the beveled, open-ended rim, a position for roasting the agricultural product at various angles in reference to the burner array, and a position for unloading the agricultural product from the barrel-basket through the beveled, open-ended rim without the need to stop rotation of the barrel-basket or requiring handling of the barrel-basket directly in any way.

12. The system of claim 11, wherein the barrel-basket can be driven at the yoke by a motor coupled to the closed end using a combination of at least one pulley with at least one of belts or chains and wherein speed of the motor is electrically adjustable.

13. The system of claim 11, wherein the barrel-basket can be driven directly at the closed end via a gear reduction box and wherein speed of the motor is electrically adjustable.

14. The system of claim 11. wherein the U-frame further comprises a foldable frame including a central section in the shape of a square "U," upstanding arms, and a base with a width greater than the largest diameter of the drum.

15. The system of claim 14, further comprising two triangular legs and axle sections connected to each of the triangular legs, and wheels mounted to at least one of the axle sections to enable movement of the system over surfaces.

16. The system of claim 11, wherein the burner array further comprises a venturi burner including circular holes cut into a rectangular burner housing.

17. The system of claim 11, wherein the burner array is mounted to a cross bracket that is further mounted to the U-frame.

18. A roasting system, comprising:
a barrel-basket having a closed end, a beveled, open-ended rim defining an open end, and a unitary side disposed between the closed end and the open end, said unitary side made of a metal mesh to enable flames to pass therethrough onto agricultural product contained therein, wherein the beveled, open-ended rim enables loading and unloading of the agricultural product through the open end, and wherein the beveled, open-ended rim prevents the agricultural product from falling out of the barrel-basket during rotation and when the open end is oriented in height above the closed end during roasting of the agricultural product;
a support yoke integrated with a U-frame and rotatably coupled to a center of the closed end of the barrel-basket, opposite the beveled, open-ended rim, wherein the support yoke facilitates rotation of the barrel-basket by mechanical action from a motor and wherein the barrel-basket can be driven at the yoke by a motor coupled to the closed end using a combination of at least one pulley with at least one of belts, or chains; and
a burner array disposed in association with the U-frame and configured to enable flame emitting therefrom to be directed towards and through the metal mesh of the unitary side of the barrel-basket onto agricultural product contained inside of the barrel-basket.

19. The roasting system of claim 18, further comprising a control arm coupled to the U-frame to enable orientation of the barrel-basket by an operator via the control arm, wherein the control arm is configured to provide pivoting motion of the barrel-basket and the height of open end with respect to the closed end into a variety of positions during operation including a position for loading the agricultural product into the barrel-basket through the beveled, open-ended rim, a position for roasting the agricultural product at various angles in reference to the burner array, and a position for unloading the agricultural product from the barrel-basket through the beveled, open-ended rim without the need to stop rotation of the barrel-basket or requiring handling of the barrel-basket directly in any way, wherein the U-frame enables pivotal orientation of the barrel-basket to be adjusted.

20. The roasting system of claim 18, wherein the burner array further comprises a venturi burner including circular holes cut into a rectangular burner housing.

* * * * *